Aug. 7, 1951  J. W. COX  2,563,583
CONVEYER EQUIPMENT FOR HANDLING AND PACKAGING EGGS
Filed April 5, 1946  7 Sheets-Sheet 1

INVENTOR.
John W. Cox
BY
Cromwell, Greist & Wyden
Attys.

Aug. 7, 1951
J. W. COX
2,563,583
CONVEYER EQUIPMENT FOR HANDLING AND PACKAGING EGGS
Filed April 5, 1946
7 Sheets-Sheet 2
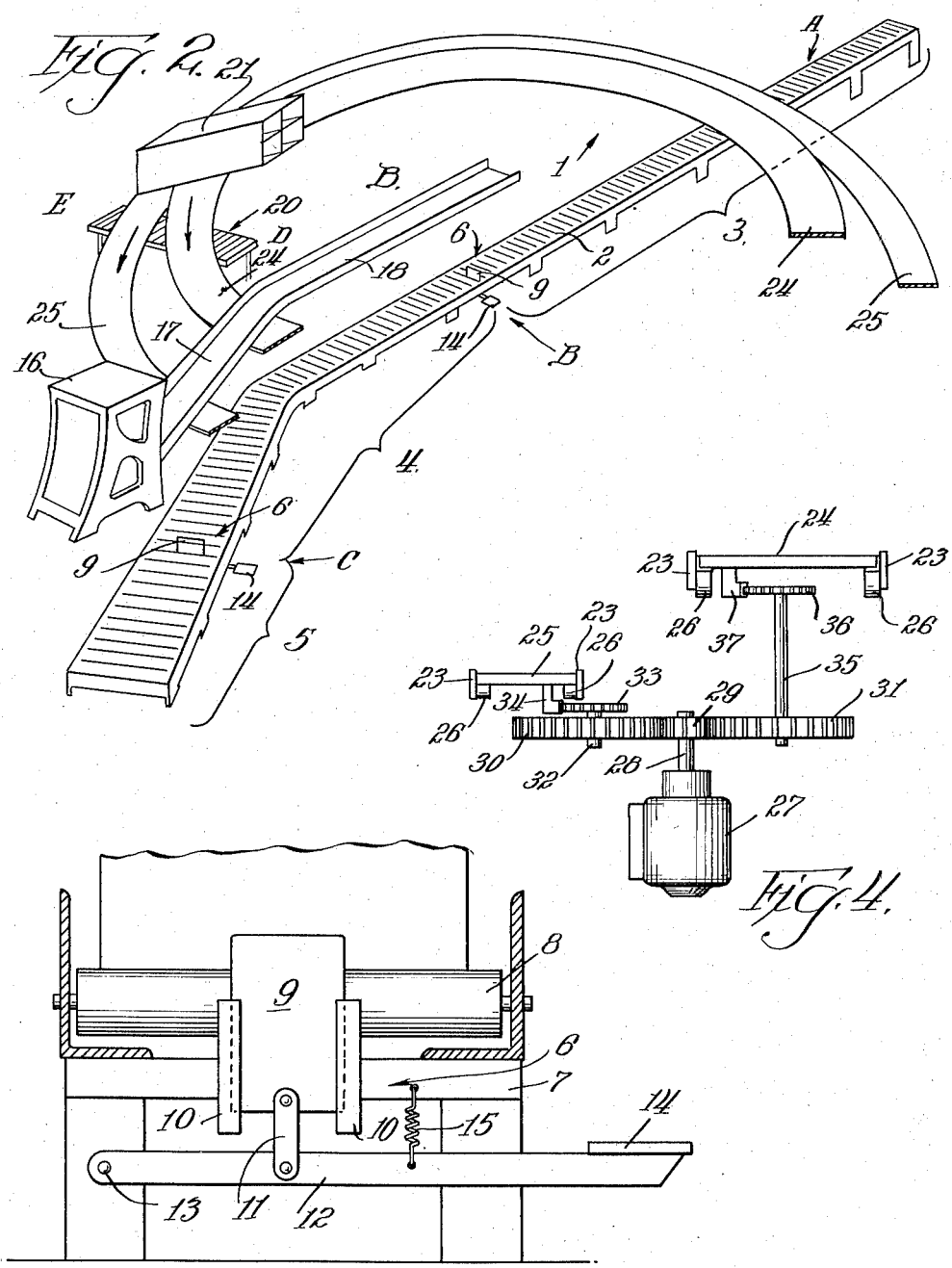
INVENTOR.
John W. Cox
BY
Cromwell, Greist and Warden
Attys.

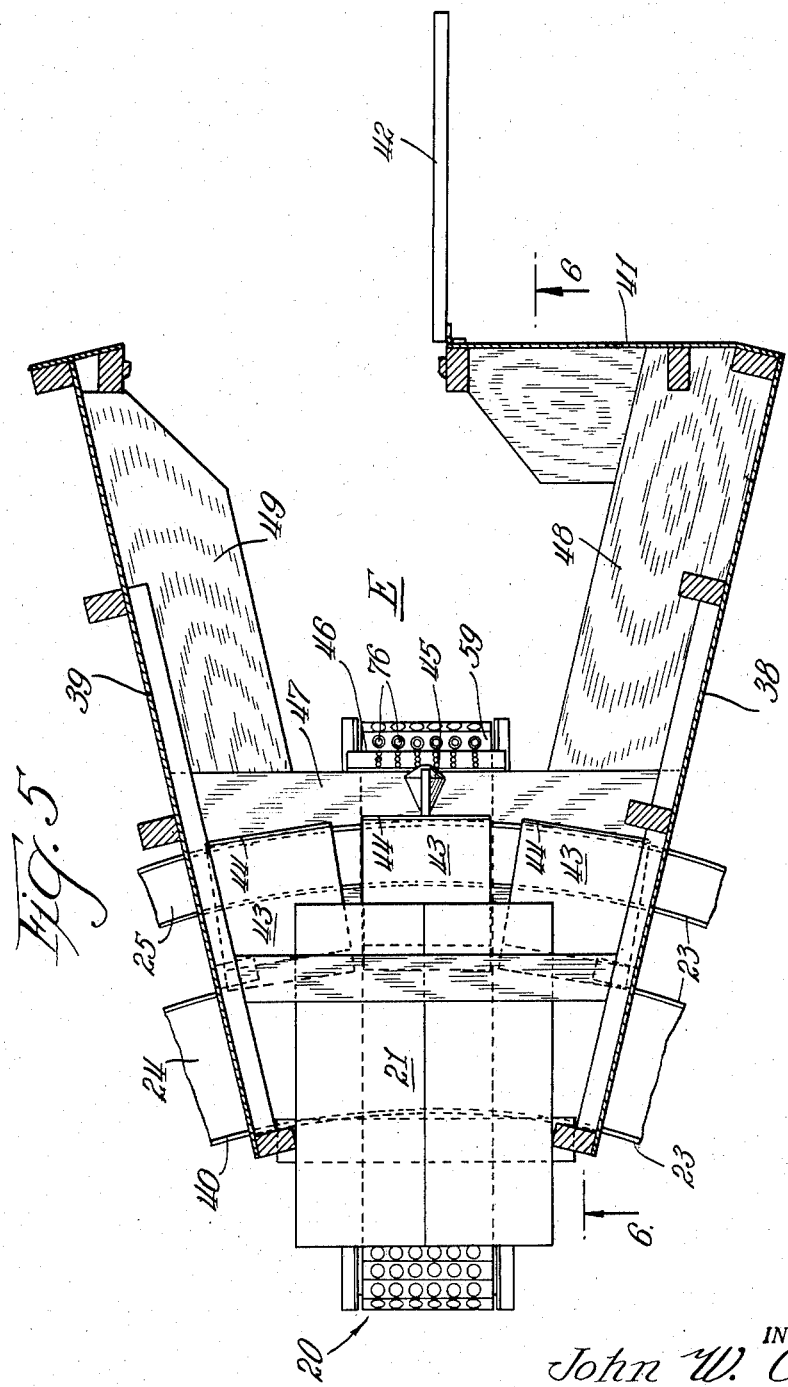

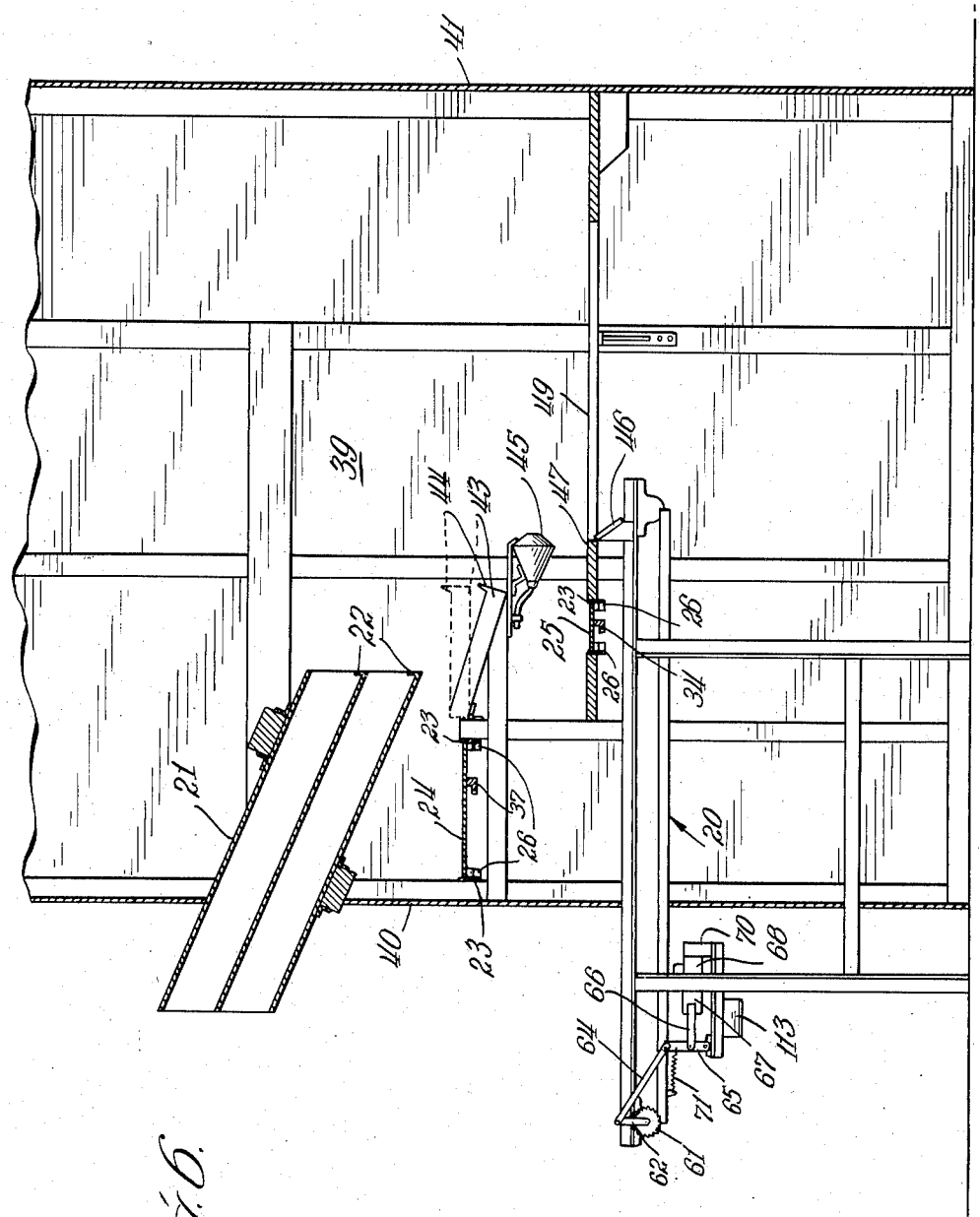

Aug. 7, 1951            J. W. COX            2,563,583
CONVEYER EQUIPMENT FOR HANDLING AND PACKAGING EGGS
Filed April 5, 1946            7 Sheets-Sheet 5
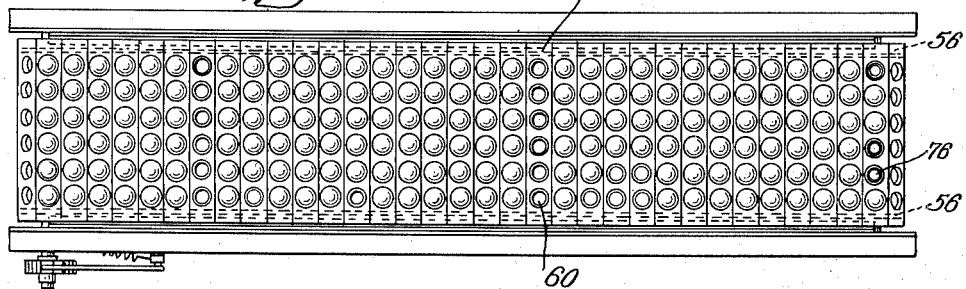
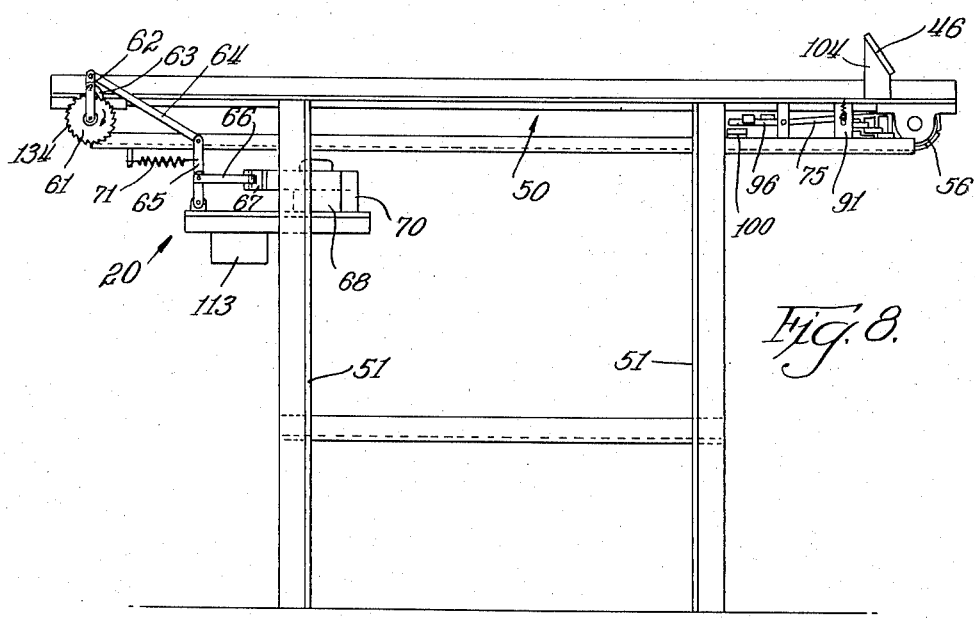
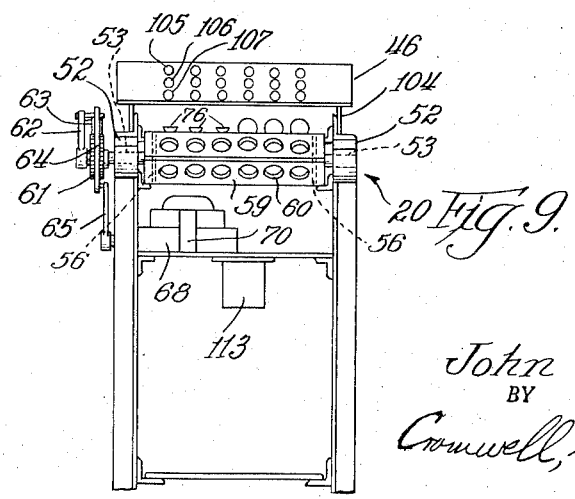
INVENTOR.
John W. Cox
BY
Cromwell, Greist & Warden
Att'ys.

Aug. 7, 1951 J. W. COX 2,563,583
CONVEYER EQUIPMENT FOR HANDLING AND PACKAGING EGGS
Filed April 5, 1946 7 Sheets-Sheet 6
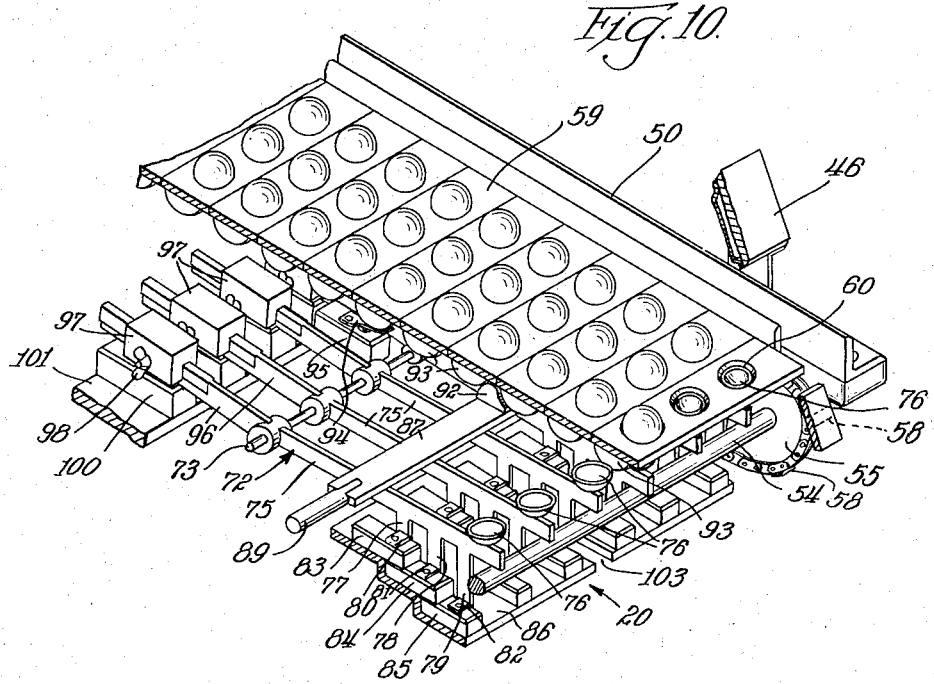
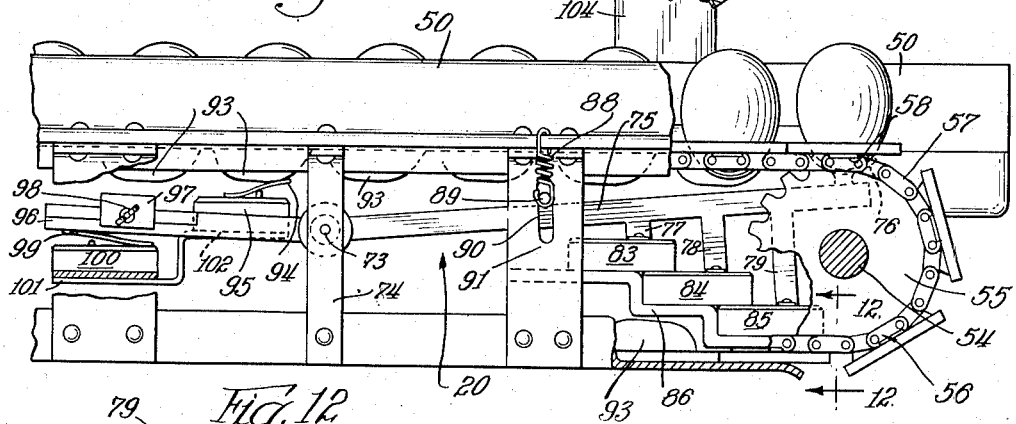
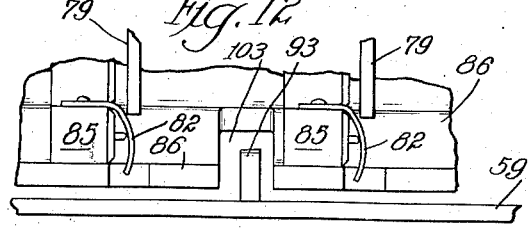
INVENTOR.
John W. Cox
BY
Cromwell, Greist & Warden
Attys.

Aug. 7, 1951 J. W. COX 2,563,583
CONVEYER EQUIPMENT FOR HANDLING AND PACKAGING EGGS
Filed April 5, 1946 7 Sheets-Sheet 7
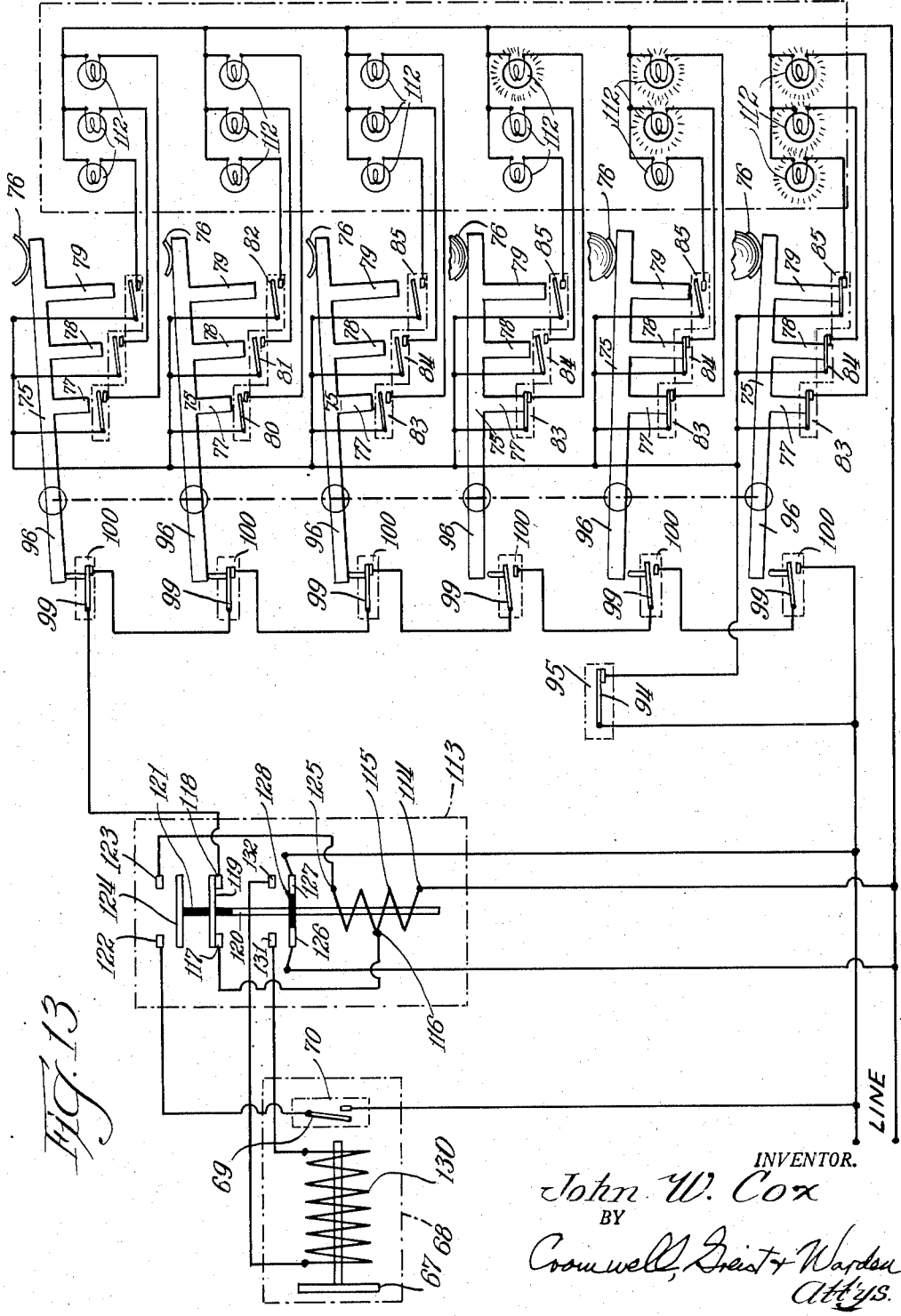
INVENTOR.
John W. Cox
BY
Cromwell, Greist & Warden
Att'ys.

Patented Aug. 7, 1951

2,563,583

UNITED STATES PATENT OFFICE 2,563,583

CONVEYER EQUIPMENT FOR HANDLING AND PACKAGING EGGS

John W. Cox, Chicago, Ill., assignor to Shellmar Products Corporation, Mount Vernon, Ohio, a corporation of Delaware Application April 5, 1946, Serial No. 660,003

14 Claims. (Cl. 198—19)

1

This invention relates to methods and mechanism for handling and packaging eggs.

A general object of the present invention is the provision of an improved mechanized egg room and system of operation by which eggs are automatically delivered from a central loading station to the operator in predetermined positions, as required, and weighed.

Another object is the provision of a circular egg room system having peripheral candling stations, automatically controlled radial egg delivery devices supplying these stations from a central loading station, and a continuous rigid, circular, rotating conveyor for carrying graded and candled eggs from the candling stations to a packing station.

More particularly, it is an object to provide apparatus or equipment for the handling and packaging of eggs which is characterized by a continuously traveling, endless conveyor having a plurality of work stations arranged along the length thereof and on one side thereof at which operators are supplied with eggs to be candled, the stations being located immediately adjacent the conveyor for convenient access in placing cartons of candled eggs thereon after packaging, together with improved devices for supplying eggs to be candled to the stations in an automatic fashion, controlled by the presence or absence of eggs on the respective devices.

Yet another specific object is to provide apparatus of the type described including a continuously acting endless conveyor having work stations arranged longitudinally therealong, preferably in immediate, side-by-side adjacency, and supply devices acting transversely across the conveyor to supply work stations on the opposite side thereof, these devices including automatically controlled egg supply units, preferably one for each station, which are controlled in their operation by the presence or absence of eggs to be supplied thereby, and material supply units of a gravitational type in which supplies of packaging materials are placed by operators opposed to the candling stations, the arrangement being such that a single operator may take care of both the supply of eggs and packaging materials therefor.

How the foregoing objects are achieved and other advantages and capabilities of the invention are set forth in the detailed description which follows and shown in the drawings, in which:

Fig. 1 is a generally diagrammatic plan view illustrating the apparatus of the invention and showing the annular conveyor and radial candling stations characterizing the same;

2

Fig. 2 is a fragmentary perspective view schematically illustrating certain of the conveyors included in the apparatus of Fig. 1;

Fig. 3 is a fragmentary detail view in vertical cross section through one of the conveyors of Fig. 2, showing details of a case stopping mechanism for one of the conveyors forming part of the apparatus shown in Figs. 1 and 2;

Fig. 4 is a diagrammatic detail showing of the mechanism for imparting movement to the annular conveyors;

Fig. 5 is an enlarged fragmentary plan view of a portion of the apparatus of Fig. 1, showing a typical egg grading booth or station wherein a candler works, a plurality of such stations being disposed around the periphery of the conveyor mechanism;

Fig. 6 is a cross-sectional view taken substantially along the line 6—6 of Fig. 5;

Fig. 7 is a plan view more clearly illustrating the automatically controlled, loose egg conveyor which is a component of the structure shown in Figs. 5 and 6;

Fig. 8 is a side elevation of the loose egg conveyor;

Fig. 9 is an end elevation of the loose egg conveyor, viewed from its discharge or unloading end;

Fig. 10 is a fragmentary perspective view, partially broken away, showing one end of the loose egg conveyor, particularly the scale mechanism, the conveyor advance mechanism and associated parts of the conveyor;

Fig. 11 is an enlarged fragmentary side elevation of one end of the loose egg conveyor, certain parts being broken away to better show the operating mechanism;

Fig. 12 is a fragmentary detail view, in section on line 12—12 of Fig. 11, illustrating the operating arms of typical light controlling microswitches and control elements for the same; and Fig. 13 is a wiring diagram illustrating certain of the electric circuits operative in the functioning of the above mechanism.

Figure 1:
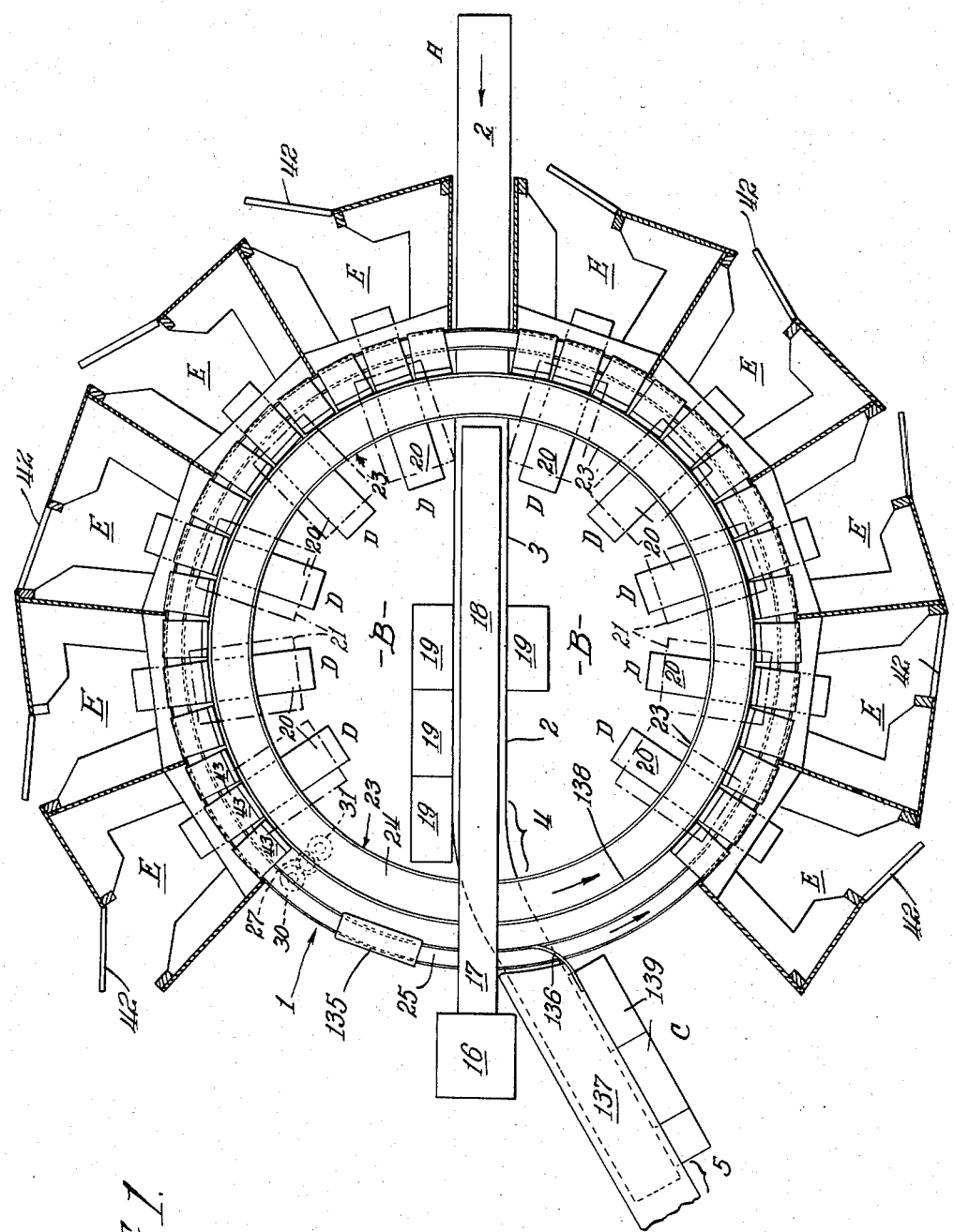

The structure generally comprises a pair of rotating, circular, horizontal conveyors 24 and 25 about which are arranged the peripheral egg candling stations E, the latter being served with eggs to be graded and candled by radial conveyors 20 which automatically advance a row of eggs to the candler in the station and automatically and simultaneously weigh each egg of the foremost row of eggs so advanced. Operators in the center of the device supply the radial conveyors with three dozen eggs at a time from a longitudinally extending conveyor 2, while eggs candled and cartoned in the stations E are carried away from the stations by the circular conveyors in cartons and flats and fillers for repacking in cases. Various other operations attending these are involved in the use of the apparatus, as will appear.

Referring now to Fig. 1, the reference numeral 1 indicates generally the annular egg handling apparatus which is preferably positioned adjacent a cold egg storage room A. Conveyor 2, which is of the roller type, extends outwardly from room A, and passes radially beneath structure 1. It is divided into three portions by case-stopping devices 6, including a portion 3 which transports filled egg cases to a central distributing station B, a portion 4 which transports emptied cases from station B to a case refilling station C, and a portion 5 extending beyond case refilling station C.

As shown in Fig. 3, the case stopping devices 6 are mounted on conveyor frame members 7, and each includes a vertically extensible and retractable blade 9 slidably carried by opposed side guides 10. This blade is articulated by a link 11 to the medial portion of a lever 12, one end of which is pivoted at 13 to frame member 7. The opposite end of lever 12 extends outwardly beyond frame member 7, and has a foot pedal 14 thereon. A coil tension spring 15 connected between frame members 7 and lever 12 serves to keep blade 9 normally elevated above the level of the rollers 8 of conveyor 2, the blade extending between a pair of adjacent conveyor rollers 8, and being retractable to permit passage of egg cases on the conveyor upon depression of pedal 14.

As shown in Figs. 1 and 2, roller conveyor 2 does not traverse egg handling mechanism 1 in a straight line throughout its length, but turns at an oblique angle in the portion 4 thereof to reach and pass station C.

The device indicated by the numeral 16 schematically represents a conventional egg carton set-up machine such as shown in Burger U. S. Patent No. 2,018,396. The discharge chute of this machine is connected to an upwardly inclined portion 17 of a carton conveyor trough 18 which intersects one side of the annular structure 1, as shown, and extends radially thereof at least as far as the case emptying and supply station B, being disposed above the level of conveyor 2 and generally parallel thereto. One or more relatively low benches 19 are disposed at station B adjacent the conveyors 2 and 18, onto which egg cases carried by portion 3 of conveyor 2 may be placed while the same are being emptied.

A plurality of loose-egg carrying conveyor mechanisms 20 traverse the annular structure 1 at radially spaced positions, and the reference characters D denote loose egg loading stations adjacent station B at which such conveyor mechanisms are loaded with eggs. The reference characters E denote generally the partition separated stations disposed around the periphery of the structure 1, at which the loose eggs are discharged or removed from conveyor mechanism 20 for candling.

As shown in Figs. 2, 5 and 6, a plurality of packaging supply chutes 21 are provided, one for each station E, comprising a plurality of parallel chutes open at each end and inclined in the direction of station E. These chutes, like conveyor mechanisms 20, over which they are positioned, intersect annular mechanism 1 to carry into station E requisite packaging materials such as cartons, filler and flats, as hereinafter described. In order to simplify the drawings the packaging supply chutes have been omitted from Fig. 1 but are illustrated in other figures. As shown in Fig. 6, transversely extending stops or ledges 22 at the outer ends of chutes 21, hold packing materials from gravitating entirely through said chutes.

The annular structure 1, as illustrated in Figs. 1, 5 and 6, includes a framework 23 providing a support for a pair of horizontal rotating, annular or ring conveyors. These operate in different horizontal, parallel planes, and are of different widths, the uppermost and the wider being indicated by numeral 24, and the lowermost and narrower being indicated by numeral 25.

Ring conveyors 24 and 25 may be made up of a series of arcuate sections of plywood rigidly fastened together in end-to-end relation to form complete circles, and are supported in sections of the framework 23 along at least their inner and outer edges by rollers 26, as illustrated in Figs. 4 and 6. The conveyors are rotated in the same direction by appropriate drive means from an electric motor 27, as shown in Fig. 4. A drive pinion 29 on the shaft of the motor engages a pair of opposed speed reduction gears 30 and 31. Gear 30 is fixedly attached to a stub shaft 32 carrying drive gear 33, the last mentioned gear being meshed with an annular rack or ring gear 34 which is rigidly attached to the under surface of ring conveyor 25. Gear 31 is fixedly attached to a shaft 35 which carries adjacent its end a drive gear 36. Gear 36 meshes with a second annular rack or ring gear 37 rigidly attached to the under surface of ring conveyor 24. Referring particularly to Figs. 5 and 6, the operator's enclosure at each egg packing station E is defined by light excluding partitions or walls, namely, the front wall 40, a rear wall 41 and side walls 38 and 39. Doors 42 permit access to stations E.

A radially arranged filler and flat holding shelf 43 is hinged to framework 23 in each booth or station E adjacent the outer periphery of ring conveyor 24 and normally tilt at a downward and outward angle relative to the conveyor 24. These shelves are upwardly swingable to the level of such conveyor, and each is provided with a transversely extending end stop 44 to prevent articles from sliding therefrom. A conventional egg candling light 45 is arranged medially of each station E, spaced above the discharge end of the loose egg conveyor mechanism 20 for that station. Preferably also spaced above conveyor 20 is an egg weight indicating means comprising a light panel 46 (shown in Figs. 11 and 13), the structural details and purposes of which are more fully described hereinafter. A shelf area 47 is formed integral with framework 23, preferably substantially in the plane of annular conveyor 25, and side shelves 48 and 49 may, if desired, be placed at a convenient level adjacent side walls 38, 39.

Referring to Figs. 8 to 12, the loose egg conveyor 20 comprises a pair of parallel frame members 50 supported by upstanding legs 51. Shafts 53, 54 are mounted in opposed parallel relation in horizontal, parallel brackets 52 at opposite ends of frame 50, these shafts having secured thereon the respective pairs of identical, spaced and aligned chain sprockets 55 (see Fig. 11) around which parallel endless chains 56 are trained. Chains 56 are made up of standard links 57 and, at equally spaced intervals, bent lug links 58. A plurality of conveyor slats 59 extend transversely of frame members 50 and are attached to chains 56 by rivets or the like extending through the bent lug links 58, said slats lying in close side-by-side arrangement with their upper surfaces in coplanar order along the top of conveyor mechanism 20. Each slat 59 is provided with six aligned circular openings 60, each opening of a size to pocket and hold an individual egg. Openings 60 are equally spaced longitudinally of each slat 59, and each slat 59 is positioned in such relation to each other slat that the egg holding openings are also equally spaced longitudinally of the conveyor. The openings in each direction are located in positions corresponding to the positions of eggs carried in conventional flats and fillers, so that the entire complement of eggs in a flat and filler may be transferred as a unit directly to the conveyor. These openings are approximately one and three-quarters inches from center to center.

As shown in Fig. 9, shaft 53 is long enough to extend outwardly of one bracket 52—and fixedly carries on its outer extension a ratchet wheel 61. Shaft 53 serves as a pivot for one end of an arm 62 carrying a spring loaded pawl 63, and the opposite end of arm 62 is pivoted to one end of a link 64, as shown in Fig. 8. As its other end link 64 is pivoted to an arm 65 which is pivotally mounted on frame 50. Medially of its length, arm 65 is connected by link 66 to the plunger or armature 67 of a solenoid 68. A switch 70 is positioned forwardly of solenoid 68, its operating arm 69 (see Fig. 13) being engageable by solenoid plunger 67 in its most advanced position for a purpose to be described hereinafter. A coil tension spring 71, one end of which is connected to frame 50 and the other end to arm 65, serves to exert rectractile force on the solenoid plunger.

As particularly shown in Figs. 10 and 11, six weighing devices 72 are positioned in horizontal alignment between the upper and lower flights of egg conveyor mechanism 20. These devices are all pivoted for individual free weighing movement on a common pivot rod 73 extending transversely of frame 50 and having its ends mounted in side supports 74. In the embodiment shown, each scale device comprises a pivotal beam 75 on the end of which is mounted an egg support in the form of a cup-like element 76, while three contact arms are spaced along the beam between its pivot and element 76. These contact arms are of different lengths, as shown in Fig. 13, reference numeral 77 indicating the shortest, 78 the one of intermediate length, and 79 the longest.

Banks of three vertically stepped microswitches 83, 84 and 85 are positioned below each scale beam 75 so that the operating arms 80, 81 and 82 thereof (see Figs. 10 and 12) are contacted serially by contact arms 77, 78 and 79, dependent on the amount of beam swing. These microswitches are mounted on a stepped bracket 86 which extends transversely of frame members 50. Extending transversely across the beams 75 of all the individual weight determining scale devices is a plate 87 which is supported at its ends by a pair of tension springs 88. Plate 87 has integral lugs 89 formed at each end by which it is guided for limited generally vertical movement in slots 90 in side plates 91. Only one of the plates is shown (Fig. 11), there being an identical plate on the opposite side of frame member 50. An upwardly extending cam 92 is positioned medially on plate 87, and in vertical alignment with this cam each slat 59 carries a cam 93 adapted to coact with cam 92. A master microswitch 95 is disposed rearwardly of cam 92 and in alignment with cams 93, the operating arm 94 of which microswitch is depressed to switch-operating position by movement of cams 93 in the manner and at the intervals hereinafter described.

As shown in Fig. 10, rearwardly of pivot rod 73 each scale beam 75 has a counterbalance arm 96 which has mounted thereon the counterbalance weight 97, the latter being slidable longitudinally of arm 96 for proper weighing adjustment of each scale device 72. Weight 97 is locked in desired position by a wing bolt 98 threaded through one side of the weight and gripping arm 96.

Below each beam is a normally open microswitch 100, the operating arm 99 of which is contacted by beam arm 96 when in its depressed position, thereby closing the microswitch. The six microswitches 100 are mounted on a transverse support 101, an extension 102 of which carries the single master microswitch 95.

As shown in Fig. 12, the lowermost step of stepped bracket 86 is provided with an opening 103 to permit passage therethrough of cams 93 mounted on transverse slats 59.

Referring now to Figs. 9 and 11, light panel 46, which serves as the visual egg weight indication means, is supported above and transversely of frame 50 by brackets 104, this panel being provided with six sets of three vertically aligned openings. The numerals 105 indicate the topmost openings, 106 indicate the middle openings, and 107 the lowermost openings in each aligned set. Each opening is preferably covered by a light diffusing glass 108. Fastened to the rear of panel 46 is a plate 109 having apertures therein corresponding to and in register with the apertures 105, 106 and 107 to receive sockets 110 which carry lamps 112.

The egg conveyor mechanisms 20 utilize for their operations two major electric circuits, namely: (1) that having to do with the egg weight determining and indicating means; and (2) that having to do with the mechanism for advancing the slats 59 longitudinally of frame members 50. The last named circuit itself includes two subsidiary circuits which may be termed (a) the relay closing circuit, and (b) the relay opening circuit. However, all circuits are in a sense interrelated, as will be seen from the diagram, and the description which follows.

Referring to the wiring diagram of Fig. 13, one side of the power supply line is connected through microswitch 95, which is normally closed, and through parallel circuits to each microswitch 83, 84, and 85, the last mentioned three switches being open in the inoperative condition of the weighing and indicating circuit of each individual weighing device, as shown. The microswitches 83, 84 and 85 are individually connected, respectively, to the lamps 112 at panel openings 105, 106, and 107, thence to the power line return.

Thus, when microswitch 95 is permitted to remain in its normally closed position, closure of the circuit of any microswitch 83 will cause its corresponding lamp 112 to light. Likewise, closure of the circuit of any microswitch 84 or 85 will cause its respective lamp to light. Since the above described circuits are in parallel, the lighting of corresponding lamps will be accomplished irrespective of the number of series into which the circuit as a whole may be multiplied, such as the series of six such interconnected circuits shown on the diagram. Also, coincident closure of circuits through microswitches 83 and 84 will simultaneously cause two corresponding lamps 112 to be lighted, and coincident closure of the circuits through microswitches 83, 84 and 85 will simultaneously cause the three corresponding lamps in each circuit to be lighted. Likewise, breaking the circuit at microswitch 95 will break the circuit to any and all lamps 112, irrespective of whether the circuits through any or all microswitches 83, 84 and 85 are closed.

The circuit illustrated in Fig. 13 includes an electrical relay 113 of the so-called "mechanically held" type including a magnetized head or armature. The relay is employed in the control circuit of the mechanism for advancing conveyor 20 at predetermined intervals, i. e., solenoid 68 and associated parts. Such control circuit includes a relay closing circuit, a solenoid energizing circuit, and a relay opening circuit, all cooperating to govern the actuation of solenoid 68.

Still referring to Fig. 13, in the relay closing circuit the power supply line is connected to relay 113 through the plurality of series connected, normally open microswitches 100. When all of these switches are closed, a circuit is completed to one side of relay 113, more particularly, to one contact 118 of a pair of spaced contacts 117, 118 adapted to be bridged by a buss bar 119 carried on the relay plunger 120. Buss bar 119 is mounted in insulated relation to the plunger 120 by the insulating material 121. The contact 117 is connected to a center tap 116 on the relay coil 115, the end tap 114 of this coil being brought back to the return side of the power supply line. The member 119 is normally in the position illustrated in Fig. 13, and when a circuit is completed through the microswitches 100, coil 115 is energized between the taps 116 and 114, and plunger 120 is elevated, immediately breaking the circuit at contacts 117, 118.

The relay plunger immediately shifts to a position wherein a circuit is completed through the further pair of contacts 122, 123 of relay 113, these contacts being bridged by a conductor bar 114 carried in insulated relation to the plunger 120. This is the relay opening circuit through the normally open switch 70 governed by solenoid 68. It includes a lead from the power supply line through the switch 70, contact 122, conductor bar 124, contact 123, the entire length of coil 115, from an end tap 125 to end tap 114 thereof, thence to the return side of the power line.

Solenoid 68 is energized by a separate circuit simultaneously with the shifting of plunger 120 when the pair of spaced contacts 126, 127 carried by an insulating block 128 on the plunger come into engagement with the third pair of fixed contacts 131 and 132 of the relay. This completes a solenoid energizing circuit, including a lead connected to the power supply line, through contacts 127, 132, solenoid coil 130, contacts 131, 126, and a lead to the return line of the power supply. Energization of solenoid coil 130 through the circuit just described causes shifting of solenoid plunger 67 to the right as viewed in Fig. 13, which plunger, in completing its stroke, advances conveyor 20 one step. Plunger 67 as it approaches its limit of forward movement engages the movable arm 69 of switch 70, thereby closing the relay opening circuit through contacts 122 and 123. This breaks the relay circuit at these contacts upon reverse movement of relay plunger 120.

The relay 113 is a standard Allen Bradley No. 700 A. C., mechanically held, solenoid type (Type BM100), including a closing spring, in which an auxiliary switch in the circuit of the closing coil is opened by the movable plunger. The arc formed by the auxiliary switch in opening interrupts the circuit at the instant of circuit magnetization of the plunger.

The operation of the several circuits will be described in greater detail hereinafter in connection with description of the mechanism to which they particularly relate.

The operation of the apparatus is an follows:

An operator in egg storage room A dumps stacks of eggs carried in flats and fillers from a number of cases on portion 3 of inclined conveyor 2, and they are gravity conveyed until stopped by the stopping device 6 adjacent central distributing stations B. Another operator places a supply of knocked-down egg cartons in in the carton set-up machine 16, by which machine such cartons are erected. Under the force of discharge by the set-up machine, the cartons travel up inclined surface 17 to conveyor 18 and along the horizontal top area of the latter toward central distributing station B.

Operators at stations B removed egg-laden flats and fillers incoming from conveyor portion 3, placing the same on benches 19. The fillers are then removed from each layer of eggs, and the eggs are picked up thirty-six at a time by egg lifters, for example, the type shown in U. S. Patent No. 2,092,847, issued September 14, 1937, to James A. Johnson. The eggs thus picked up are carried to loose egg loading stations D and are placed on the series of slats 59 forming the top surface of the several loose egg conveyor mechanisms 20, each egg occupying one opening 60 in slats 59. Opened cases of eggs may be sent to the stations B on conveyor 2, but it is preferred to dump the cases beforehand and to send in stocks of flats and fillers containing eggs, as this makes their transfer to the conveyors 20 easier. Also, other methods of transfer to conveyors 20 may be used. For instance, the eggs may be transferred directly from the flats and fillers to the conveyor, or they may be forked over.

The operators also fill packaging material conveyor chute means 21 with appropriate quantities of set up egg cartons taken from conveyor 18 and a supply of fillers and flats from which eggs have been removed.

The egg packer preferably arranges one flat and filler on each of the several radially arranged hinged shelves 43, and also appropriately arranges such series of egg cartons as she may require within easy reach on shelves 47, 48 and 49.

When a supply of eggs has been placed on the upper flight of any loose egg conveyor mechanism 20 the circuits of such mechanism are closed, thereby causing such mechanism to go into operation. As more fully explained hereinafter, the cup-like egg supports 76 are of smaller cross dimension than the openings 60 in any slat 59 and such egg supports are extensible a distance about the level of the slats when the conveyor reach or run formed by them is at rest. When the egg supports are relieved of eggs they extend upwardly to their point of maximum extension, permitting counterbeams 96 to depress and close microswitches 100, hence causing operation of the conveyor advance mechanism. Thus, with all the egg supports 76 of a given slat devoid of eggs the conveyor advances one slat, and the in-series circuit through all microswitches 100 will be closed immediately after the advance of each slat. Thus the slats will be advanced step by step until at least one egg support carries one egg. At that time the conveyor will come to rest.

When conveyor 20 is at rest and one or more of the egg supports or cups 76 are in egg supporting position, it will be noted that (1) beam depressing bar 87 is out of contact with scale beams 75, being held in elevation thereabove by tension springs 88, with cam 92 positioned within an interstice between a pair of cams 93; (2) egg support 76 extends through openings 60; (3) at least one and possibly more contact arms (77, 78, 79) are in operative contact with one or possibly more operating levers (80, 81, 82) of microswitches 83, 84 and 85, thereby closing one or more of the light circuits shown in Fig. 13; (4) one cam 93 is in contact with but insufficiently advanced to impart operative movement to operating lever 94 of microswitch 95; and (5) each counterbeam 96 is elevated above and out of contact with operating lever 99 of each microswitch 100.

Assuming that endmost slat 59 of conveyor mechanism 20 has carried six eggs forward to the position that all six scale beams 75 and their associated egg supporting elements 76 have gone into loaded, egg supporting position, all six elements 76 will extend above the level of endmost slat 59, being downwardly depressed somewhat from their maximum point of elevation depending on the weight of the egg on each egg supporting element 76. For instance, if a light egg is on one weighing device, the scale beam 75 will be depressed but slightly, in which case only contact arm 77 would come into contact with operating lever 80 of microswitch 83. In such case the electric circuit to one lamp 112 of the group of three of the same shown in Fig. 13 would be lighted. If a medium weight egg is on any egg support 76, its associated scale beam 75 would be sufficiently depressed so that contact arm 78, in addition to arm 77, will be brought into contact with operating lever 81 of microswitch 84, thereby completing the electric circuit to middle lamp 112 in panel 46, there thus being two lights illuminated in the bank corresponding to that particular weighing device. If a heavy egg is positioned on a particular egg supporting element 76, its corresponding scale beam 75 will be depressed sufficiently to additionally permit contact arm 79 to engage operating lever 82 of microswitch 85, thereby closing the electric circuit to and lighting a third lamp 112 in the bank of lights corresponding to that particular scale device.

Thus, a glance at panel 46 tells the operator whether the egg on each egg supporting element is large, medium or small, depending upon the number of lights which are shown lighted in each bank of lights, each such bank being in alignment with its corresponding egg weighing device.

Removal of the egg from any egg support 76 for candling at light 45 permits scale beam 75 to rise to its highest level, carrying with it integral contact arms 77, 78 and 79. At such time all said contact arms raise out of engagement with any and all switch operating levers 80, 81 and 82, and any and all lamps 112 in the bank of lights corresponding to that scale device are extinguished. Also, counterbeam 96 swings into a lower position, contacting switch operating lever 99 of associated microswitch 100, thereby closing that portion of the relay closing circuit passing through that switch. So long as any one of the microswitches 100 is open, the relay circuit will be broken and the mechanism cannot be advanced.

Usually the egg packer wil not remove eggs singly from egg supporting elements 76, but will pick up several at a time. The operator will then individually pass the eggs across the beam of candling light 45 to determine the internal quality thereof.

Assuming, for the purpose of illustration, that the clean, unchecked, edible eggs were being packed into grades of A large, A medium, A small, B large, and grade C (which latter grade would contain eggs of B medium and small grades as well as eggs actually grading C), the packer would have before her on shelf 47 five different types of egg cartons into which the cartonable eggs would be placed. Uncartonable eggs such as inedibles, dirties and checks would be placed in fillers and flats reposing on hinged shelves 43.

As stated hereinbefore, as the egg packer removes each egg of the series from the egg supporting element 76, each counter beam 96 drops into contact with microswitch operating lever 99 of each microswitch 100. When all the eggs are removed from all the said elements 76 and all counterbeams 96 have depressed, the relay closing circuit will then be closed.

Completion of the relay closing circuit shown activates and magnetizes that portion of the coil 115 in relay 113 which lies between connections 114 and 116, and relay plunger 120 is thereby pulled forward so that solenoid plunger cross bar 124 is brought into electrical bridging and connecting relation across the gap between contacts 122 and 123. At the same time relay plunger block 128 is in position such that contacts 126 and 127 are brought into operative contact with contacts 131 and 132, thereby closing the electrical circuit to solenoid coil 130 of solenoid 68. Closure of the last above mentioned circuit activates and magnetizes solenoid coil 130, pulling forward solenoid plunger 67.

When solenoid plunger 67 is in its forwardmost position, it contacts and depresses the operating arm 69 of normally open microswitch 70, thereby completing the relay opening circuit. The closure of the relay opening circuit activates and magnetizes that entire portion of the relay coil 115 between connections 114 and 125, and relay solenoid plunger 120 is then withdrawn to assume the position shown in Fig. 13, thereby breaking the operating circuit of solenoid 68. The plunger of solenoid 68 then returns to its original unextended position under the pull of tension spring 71.

As will be seen in Fig. 8, forward movement of mechanism operating solenoid plunger 67 causes forward movement of spring loaded pawl 63. Forward movement of the latter causes the ratchet wheel 61 to be partially rotated in the direction indicated on the drawings, carrying with it in such rotation shaft 53 and sprocket wheels 55. The latter are drivingly associated with parallel endless chains 55 affixed to slats 59, so that forward movement is thus imparted to the series of such slats as a unit.

The length of each step of forward travel of mechanism 20 is equal to the width of a single slat 59. Thus the egg packer, having removed all eggs from egg supports 76, has brought before her another series of eggs.

The mechanism through which the solenoid advances the conveyor is geared to provide one and three-quarters inches movement during each cycle or step of operation. The slats 59 are one and three-quarters inches in width, so each activation of the solenoid advances the conveyor just the right amount to present a new row of eggs in predetermined position before the candler and in register with the weighing devices 76.

Referring now to Fig. 10, during the forward movement of the slats 59, one of the cams 93 is brought into edge-to-edge contact with cam 92 on depressing bar 87, thereby depressing the same. Bar 87 is thus brought into contact with all beams 75 of all weighing devices 72, depressing the same to such an extent that all egg supports 76 are withdrawn out of openings 60 and sufficiently below slats 59 to be entirely out of the path of travel of slats 59 as they are advanced.

It will be noted that during the time scale beams 75 are depressed by bar 87, all the contact arms 77, 78 and 79 are in engagement, respectively, with operating arms 80, 81 and 82 of microswitches 83, 84 and 85. Under these circumstances all the light circuits shown in Fig. 13 will be closed, and normally all lamps 112 would be lighted. To overcome this possible objection, in the advancing movement of slats 59, one of the cams 93, other than the cam which caused depression of transverse bar 87, contacts arm 94 of microswitch 95, thereby opening this normally closed switch. As shown in Fig. 13, switch 95 is in a controlling position with respect to all the light circuits shown, hence, the above described action temporarily breaks the circuit to all the weight indicating lights 112, extinguishing them until the mechanism has come to rest at the weighing position.

When the upper conveyor flight of loose egg conveyor mechanism has completed one step of advance, the transversely extending beam depressing bar 87 is returned to normal elevated position by tension springs 88, cam 92 on said bar assuming a position in the spaces between a pair of cams 93. Coincidentally, all scale beams 75 elevate counterclockwise under gravity to permit egg supports 76 to extend through openings 60 and go into egg supporting relationship to the eggs newly brought forward therein. When egg supports 76 are in egg supporting relation, the entire loose egg conveyor mechanism is at rest and will not again advance until all the eggs are removed from the egg supports 76. When this is accomplished an automatic repetition of its advancing operation occurs. The weight of any egg will continue to be shown on panel 46 until the egg is removed from egg support 76, at which time a further supply is advanced before the operator in the manner hereinbefore indicated.

The egg packer at station E continues to remove eggs from egg supports 76, determines their internal quality under the beam of candling light 45, and places the eggs either in fillers and flats (inedibles, dirties and checks) or in appropriate egg cartons in accordance with their weight and internal quality as hereinbefore indicated.

When a filler and flat assembly positioned on hinged shelf 43 has been completely filled with eggs, the operator tips the shelf upwardly to the level of annular conveyor 24 and shoves the flat and filler assembly thereon. When any egg carton is filled, the operator shoves it onto rotating annular conveyor 25, the top of the carton being unclosed and extending upwardly, and the longitudinal dimension of the carton extending in the direction of rotation of said conveyor 25.

As will be seen in Fig. 1, a carton closing machine 135 of the type shown in Patent No. 2,242,304 to Johnson is interposed in the path to annular conveyor 25 at a point in its travel forwardly to station C. Carton closer 135 bends the carton tops down out of their upright position when placed on conveyor 25, and locks the cover in closed position. If desired, it places a seal and date thereon. In the form of closer shown, the egg cartons remain on annular conveyor 25 throughout the closing operation and continue thereon until they reach station C, although the cartons may be shunted off the conveyor onto a separate closer and sealer.

Adjacent station C, as shown in Fig. 1, a carton diverting device 136 extends angularly outward and above the surface level of conveyor 25, and shunts the closed egg cartons onto the top surface of a packing table 137. A bar or fence 138 extends transversely of and above the surface level of annular conveyor 24 to prevent passage therebeyond of fillers and flats containing eggs.

In those instances where empty egg cases are originally placed on conveyor 2 at A, after service persons working in station B have removed the eggs, fillers and flats in which such eggs were originally packed from the egg cases may then be manually placed on portion 4 of conveyor 2 and transported around the oblique angular bend shown therein to a second case stopping device 6, such as shown in Figs. 2 and 3, to a position adjacent station C. At station C the then empty egg cases are removed from conveyor 2 and placed on low benches 139, such as shown in Fig. 1. The majority of the cases are then filled with eggs in cartons shunted off annular conveyor 25 by carton diverting device 136. The case packer may also reach across annular conveyor 25 and bar 138 and remove from annular conveyor 24 the filler and flat assemblies arriving adjacent station C, packing such assemblies in cases.

When egg cases are filled with eggs, either in cartons or fillers and flats, they may then be manually placed on portion 5 of conveyor 2, by which they may be conveyed to any appropriate spot for disposal.

I claim:

1. Egg handling apparatus, comprising conveyor means for transporting egg packing materials, means providing a central distribution station serviced by said transporting means, a plurality of individual conveyors extending outwardly from said central distribution station, a rotatable annular conveyor the path of travel of which is crossed by said individual conveyors, said annular conveyor having a plurality of egg packing stations arranged in a generally circumferential series externally thereof, each serviced by one of said individual conveyors, the individual conveyors discharging into and the annular conveyor being accessible from within said packing stations, and means disposed substantially in the plane of and in receiving relation to said annular conveyor to divert packaged eggs from said annular conveyor.

2. Egg handling apparatus, comprising means to transport egg packing materials, means providing a central distribution station serviced by said conveyors transporting means, a plurality of individual conveyors extending outwardly from said central distribution station, a pair of concentric, rotatable annular conveyors, the path of travel of at least one of which is crossed by said individual conveyors, said annular conveyors having a plurality of egg packing stations arranged in a generally circumferential series externally thereof, each serviced by one of said individual conveyors, the individual conveyors discharging into and the annular conveyor being accessible from within said packing stations, and means arranged substantially in the plane of one of said annular conveyors and in receiving relation thereto to divert packaged eggs from said last named annular conveyor.

3. Egg room apparatus comprising an endless horizontal conveyor, means providing a plurality of work stations spaced along said conveyor on one side thereof, including shelf means disposed adjacent said conveyor, said conveyor and shelf means each being located at a height enabling convenient manual access thereto by operators seated at said respective work stations, a plurality of egg supply devices spaced along said conveyor and acting transversely thereof, said devices being positioned to deliver eggs beneath said conveyor to said work stations, and each having an egg delivery end adjacent the shelf means of said respective work stations and an egg receiving end on the side of said conveyor opposite said work stations, and a plurality of carton supply devices acting transversely of said conveyor to deliver cartons at said work stations, each of said last named devices having carton receiving and carton delivery ends disposed on opposite sides of said conveyor.

4. Egg room apparatus comprising an endless horizontal conveyor, means providing a plurality of work stations spaced along said conveyor on one side thereof, including shelf means disposed adjacent said conveyor, said conveyor and shelf means each being located at a height enabling convenient manual access thereto by operators seated at said respective work stations, a plurality of egg supply devices spaced along said conveyor and acting transversely thereof, said devices being positioned to deliver eggs beneath said conveyor to said work stations, and each having an egg delivery end adjacent the shelf means of said respective work stations and an egg receiving end on the side of said conveyor opposite said work stations, a plurality of carton supply devices acting transversely of said conveyor to deliver cartons at said work stations, each of said last named devices having carton receiving and carton delivery ends disposed on opposite sides of said conveyor, and a further endless horizontal conveyor generally paralleling said first named conveyor at a different elevation.

5. Egg room apparatus comprising a continuously traveling conveyor traversing an endless, horizontal, orbital path, means providing a plurality of work stations adjacent and spaced along one side of said conveyor, a plurality of intermittently operable egg supply devices spaced along the opposite side of said conveyor and acting transversely of the same to deliver eggs at said stations at a level beneath said conveyor, and a plurality of carton supply devices spaced along said conveyor in transverse, intersecting relation to the same and delivering egg cartons at said stations, said respective egg and carton supply devices being disposed in sets in substantial vertical alignment with one another, there being one set for each of said stations.

6. Apparatus of the type described, comprising a continuously operating, horizontally traveling conveyor member, a plurality of work stations spaced along and adjacent a side of said conveyor member, and a plurality of intermittently operable article supply devices spaced along said conveyor member and operating transversely thereof to deliver articles to said stations for convenient access of operators therein, said last named devices including means automatically controlling the intermittent operation thereof, which means is in turn controlled in its operation by the weight of articles supplied to said stations by said last named devices.

7. Apparatus of the type described, comprising a continuously operating, horizontally traveling conveyor member, a plurality of work stations spaced along and adjacent a side of said conveyor member, and a plurality of intermittently operable article supply devices spaced along said conveyor member and operating transversely thereof to deliver articles to said stations for convenient access of operators therein, said last named devices passing beneath said conveyor member and including means automatically controlling the intermittent operation thereof, which means is in turn controlled in its operation by the weight of articles supplied to said stations by said last named devices.

8. Apparatus of the type described, comprising a continuously operating, horizontally traveling conveyor member, a plurality of work stations spaced along and adjacent a side of said conveyor member, a plurality of material supply devices spaced along said conveyor member in position and acting transversely thereof to deliver material to said stations, and a plurality of intermittently operable article supply devices spaced along said conveyor member and operating transversely thereof to deliver articles to said stations for convenient access of operators therein, said last named devices including means automatically controlling the intermittent operation thereof, which means is in turn controlled in its operation by the weight of articles supplied to said stations by said last named devices.

9. Egg room apparatus of the type described, comprising a continuously operating, horizontally traveling conveyor member, a plurality of work stations spaced along said conveyor member and each provided with a forward work shelf adjacent said conveyor member, a plurality of material supply devices spaced along said conveyor member, said devices acting transversely of said member to deliver cartoning material to said stations in close adjacency to the respective shelves thereof, and a plurality of intermittently operable egg supply devices along said conveyor member and operating transversely thereof to deliver articles to said stations adjacent said respective shelves for convenient access of operators in the stations, said last named devices including means automatically controlling the intermittent operation thereof, which means is in turn controlled in its operation by the weight of eggs supplied to said stations by said last named devices.

10. Egg room apparatus of the type described, comprising a continuously operating, horizontally traveling conveyor member, a plurality of work stations spaced along said conveyor member and each provided with a forward work shelf adjacent said conveyor member, a plurality of material supply devices spaced along and above said conveyor member, said devices acting transversely of said member to deliver cartoning material downwardly to said stations in close adjacency to the respective shelves thereof from a higher elevation, and a plurality of intermittently operable egg supply devices along said conveyor member and operating transversely thereof to deliver articles to said stations adjacent said respective shelves for convenient access of operators in the stations, said last named devices including means automatically controlling the intermittent operation thereof, which means is in turn controlled in its operation by the weight of eggs supplied to said stations by said last named devices.

11. Egg room apparatus of the type described, comprising a continuously operating, horizontally traveling conveyor member, a plurality of work stations spaced along said conveyor member and each including a forward work shelf adjacent said conveyor member, a plurality of material supply devices spaced along said conveyor member and acting transversely thereof to deliver cartoning material to said stations, a plurality of intermittently operable egg supply devices along said conveyor member and operating transversely thereof to deliver articles to said stations adjacent said respective shelves for convenient access of operators in the stations, said last named devices being disposed at a level beneath said conveyor member and including means automatically controlling the intermittent operation thereof, which means is in turn controlled in its operation by the weight of eggs supplied to said stations by said last named devices, and a further continuously traveling conveyor member adjacent said stations in general parallelism with said first named member and in vertically spaced relation thereto, said further conveyor member serving to transport materials away from said stations.

12. Egg room apparatus of the type described, comprising a continuously operating, horizontally traveling conveyor member, a plurality of work stations spaced along said conveyor member and each including a forward work shelf adjacent said conveyor member, a plurality of material supply devices spaced along and above said conveyor member and acting transversely thereof to deliver cartoning material downwardly to said stations from a higher elevation, a plurality of intermittently operable egg supply devices along said conveyor member and operating transversely thereof to deliver articles to said stations adjacent said respective shelves for convenient access of operators in the stations, said last named devices being disposed at a level beneath said conveyor member and including means automatically controlling the intermittent operation thereof, which means is in turn controlled in its operation by the weight of eggs supplied to said stations by said last named devices, and a further continuously traveling conveyor member adjacent said stations in general parallelism with said first named member and in vertically spaced relation thereto, said further conveyor member serving to transport materials away from said stations.

13. Apparatus of the type described, comprising the combination with a continuously operating, horizontally traveling conveyor member having a plurality of work stations arranged along a side of said conveyor member, of a plurality of intermittently operable article supply devices spaced along said conveyor member and operating transversely thereof to deliver articles to a delivery point adjacent said stations for convenient access of operators therein, and means automatically governing the intermittent operation of said devices, said means including means controlled in its operation by the presence or absence at said delivery point of articles to be supplied by said devices.

14. Apparatus of the type described, comprising the combination with a continuously operating, horizontally traveling conveyor member having a plurality of work stations arranged in immediate succession along a side of said conveyor member, of a plurality of intermittently operable article supply devices, one for each station, spaced along said conveyor member and operating transversely thereof to deliver articles to said stations for convenient access of operators therein, said last named devices passing beneath said conveyor member, and means automatically governing the intermittent operation of said devices, said means including means controlled in its operation by the presence or absence at said delivery point of articles to be supplied by said devices.

JOHN W. COX.

REFERENCES CITED

The following references are of record in the file of this patent:

UNITED STATES PATENTS

| Number | Name | Date |
|---|---|---|
| 1,141,593 | Woerden | June 1, 1915 |
| 1,204,428 | Grandfield | Nov. 14, 1916 |
| 1,444,359 | Rand | Feb. 6, 1923 |
| 1,445,797 | Pierce | Feb. 20, 1923 |
| 1,514,281 | Grubb | Nov. 4, 1924 |
| 1,897,901 | Hagopian | Feb. 14, 1933 |
| 1,930,621 | Meyer | Oct. 17, 1933 |
| 1,946,452 | Bridges | Feb. 6, 1934 |
| 1,991,223 | Ledig et al. | Feb. 12, 1935 |
| 2,138,285 | Spiegl | Nov. 29, 1938 |
| 2,273,591 | Powell | Feb. 17, 1942 |
| 2,359,786 | Pechy | Oct. 10, 1944 |

FOREIGN PATENTS

| Number | Country | Date |
|---|---|---|
| 339,115 | Great Britain | Dec. 4, 1930 |

Certificate of Correction

Patent No. 2,563,583 August 7, 1951

JOHN W. COX

It is hereby certified that error appears in the printed specification of the above numbered patent requiring correction as follows:

Column 5, line 6, after "opening" insert *being*; line 25, for "As" read *At*; column 8, line 23, after "machine" and before the comma insert *16*; column 12, line 73, strike out "conveyors";

and that the said Letters Patent should be read as corrected above, so that the same may conform to the record of the case in the Patent Office.

Signed and sealed this 18th day of December, A. D. 1951.

[SEAL]

THOMAS F. MURPHY,
*Assistant Commissioner of Patents.*